(12) United States Patent
Sunay et al.

(10) Patent No.: US 9,674,859 B2
(45) Date of Patent: Jun. 6, 2017

(54) METHOD AND APPARATUS FOR VIRTUAL CHANNEL STATION INFORMATION BASED WIRELESS RADIO ACCESS NETWORK VIRTUALIZATION

(71) Applicant: ARGELA-USA, INC., Sunnyvale, CA (US)

(72) Inventors: Mehmet Oguz Sunay, San Francisco, VA (US); Ulas Can Kozat, Mountain View, CA (US)

(73) Assignee: NETSIA, Sunnyvale, CA (US)

( * ) Notice: Subject to any disclaimer, the term of this patent is extended or adjusted under 35 U.S.C. 154(b) by 0 days.

(21) Appl. No.: 15/169,730

(22) Filed: Jun. 1, 2016

(65) Prior Publication Data
US 2017/0071008 A1 Mar. 9, 2017

Related U.S. Application Data

(60) Provisional application No. 62/215,113, filed on Sep. 7, 2015.

(51) Int. Cl.
| | |
|---|---|
| *H04W 72/12* | (2009.01) |
| *H04W 72/04* | (2009.01) |
| *H04W 16/14* | (2009.01) |
| *H04W 8/18* | (2009.01) |
| *H04L 5/00* | (2006.01) |

(52) U.S. Cl.
CPC ........ *H04W 72/121* (2013.01); *H04L 5/0057* (2013.01); *H04W 8/186* (2013.01); *H04W 16/14* (2013.01); *H04W 72/042* (2013.01); *H04W 72/0413* (2013.01)

(58) Field of Classification Search
None
See application file for complete search history.

(56) References Cited

U.S. PATENT DOCUMENTS

| | | |
|---|---|---|
| 8,351,948 B2 | 1/2013 | Kokku et al. |
| 8,660,071 B2 | 2/2014 | Borran et al. |
| 8,681,729 B2 | 3/2014 | Wengerter et al. |
| 8,700,047 B2 | 4/2014 | Kokku et al. |

(Continued)

OTHER PUBLICATIONS

Chengchao Liang; F. Richard Yu; Xi Zhang, Information-Centric Network Function Virtualization over 5G Mobile Wireless Networks, Jun. 1, 2015, IEEE, vol. 29 , Issue: 3, 68-74.*

(Continued)

*Primary Examiner* — Noel Beharry
*Assistant Examiner* — Wilfred Thomas
(74) *Attorney, Agent, or Firm* — IP Authority, LLC; Ramraj Soundararajan (57) ABSTRACT

Disclosed within is a communication architecture for medium access control (MAC) layer virtualization, where the architecture is made up of: a MAC layer, a plurality of physical resource blocks (RBs) associated with the MAC layer, a plurality of virtual medium access control (vMAC) layers (each vMAC layer corresponding to a separate service group, where each service group programs its own scheduling logic in each vMAC instance), a plurality of virtual resource blocks (vRBs) associated with each vMAC layer (the vRBs filled with data packets according to the scheduling logic in each vMAC instance), where the MAC layer virtualizes the RBs as vRBs and assigns them to each vMAC layer.

18 Claims, 9 Drawing Sheets

(56) References Cited

U.S. PATENT DOCUMENTS

| | | |
|---|---|---|
| 8,831,522 B2 | 9/2014 | Bhattad et al. |
| 8,873,482 B2 | 10/2014 | Kokku et al. |
| 8,874,125 B2 | 10/2014 | Mahindra et al. |
| 8,923,239 B2 | 12/2014 | Kokku et al. |
| 2010/0046456 A1* | 2/2010 | Yi .................... H04W 72/10 370/329 |
| 2011/0029347 A1 | 2/2011 | Kozat et al. |
| 2012/0002620 A1 | 1/2012 | Kokku et al. |
| 2012/0044876 A1 | 2/2012 | Taaghol |
| 2013/0094486 A1 | 4/2013 | Bhanage et al. |
| 2014/0045513 A1 | 2/2014 | Lim |
| 2014/0247792 A1 | 9/2014 | Wang |

OTHER PUBLICATIONS

Seon Yeong Han, Byoungheon Shin ; Dongman Lee, A Fine-Grain Partial MAC Virtualization to Support Cross Layer Design in Wireless Ad Hoc Networks, Sep. 8-11, 2014, IEEE, 506-509.*

* cited by examiner

METHOD AND APPARATUS FOR VIRTUAL CHANNEL STATION INFORMATION BASED WIRELESS RADIO ACCESS NETWORK VIRTUALIZATION

RELATED APPLICATIONS

This application claims benefit of U.S. provisional application Ser. No. 62/215,113 filed Sep. 7, 2015.

BACKGROUND OF THE INVENTION

Field of Invention

The present application relates to the medium access control operations of the radio access networks of wireless broadband communication systems, cellular systems, and more particularly, methods and apparatus for virtualizing the wireless system resources and decoupling the user scheduling operation form the operation of resource assignment base stations.

Discussion of Related Art

This invention is concerned with the specification of a method and apparatus for the virtualization of wireless resources for a wireless system where multiple virtual MAC layer slices may operate simultaneously in a base station. While the scheduling operations conducted by the virtual MAC layers decide on which users and flows will get service, the assignment of the physical wireless resources to these users and flows is decoupled from such scheduling operations using this invention.

A number of related art is present. The patent application US 2011/0029347 A1 presents a wireless network virtualization scheme, where each mobile virtual network operator (MVNO) bids for resource blocks by providing a per-user rate-utility function to the network operator. Mobile network operator (MNO) in return makes rate allocation to each MVNO, set current and future prices for the resource blocks, based on sum-utility maximization across all users. MVNOs transfer the bytes for each user based on the allocation and update utility functions of each user.

The patent application US 2013/0094486 A1 discloses a virtualization scheme for wireless local area networks, where multiple virtual access points sharing the same physical access point are granted time shares to access the resources of the physical access point for transmitting the data packets of users associated with the said virtual access points over the wireless medium.

The patent application US 2012/0044876 A1 discloses a virtualized base station belonging to an operator A and a mobile subscriber of another operator B can access to its home network (i.e., B) after a virtual base station that is part of operator B is instantiated on the virtualized base station that belongs to operator A.

The U.S. Pat. No. 8,873,482 B2 discloses a wireless network virtualization substrate at the scheduling layer, where each MVNO requests bandwidth and/or slot reservations (where slot refers to time, frequency, spreading code, etc., resources specifying the unit of resource block) from the virtualization substrate. The virtualization substrate first picks an MVNO to schedule over a slot (e.g., after sorting each MVNO with respect to the ratio of bandwidth/resource allocated and bandwidth/resource reserved). The invention also includes utility maximization based allocation strategies in deciding which MVNO should be assigned to what slot. Then, the virtualization substrate schedules the flows of the selected MVNO on the allocated slots. Each MVNO can control the ordering of flows and packets by specifying the scheduling policy for its own flows, putting virtual time tags in the packet headers, or any other means that do not impede the line speed processing.

The U.S. Pat. No. 8,351,948 B2 and U.S. Pat. No. 8,700,047 B2 both disclose a customizable flow management in a cellular base station, where a plurality of custom flow management schedulers coexists on the same base station. Each flow management scheduler executes a flow management function, which can be configured and programmed by an external entity to change the flow selection process in each scheduler.

The patent application US 2012/0002620 A1 discloses a method for remotely virtualizing the flows from an entity external to the base station without modifying the base station itself. Virtualization entity shapes the traffic flows and schedules them before forwarding them to the base station entity. A synchronizing function on the external entity prevents packets being backlogged at the base station by matching the shaped traffic rate to the base station's transmission rate.

The U.S. Pat. No. 8,874,125 B2 discloses a method where a plurality of individually virtualized base stations in a radio access network is shared across MVNOs. At an aggregator/gateway node, resources are allocated centrally to each MVNO on all base stations connected to the said aggregator node. Aggregator/gateway node dynamically compute optimal resource share of each MVNO on each base station based on revenue maximization. The computed shares are passed onto the scheduler at each base station, where the resource shares of MVNOs are locally enforced.

Embodiments of the present invention are an improvement over prior art systems and methods.

SUMMARY OF THE INVENTION

The present invention considers a wireless network where users or flows of users sharing a common spectrum are grouped together so that each group may be subjected to its own set of medium access (MAC) protocols. The network operator or service provider that serves a plurality of subscribers defines a service group for said plurality of subscribers and controls the corresponding virtualized MAC for the said service group. The grouping of users or flows of users into service groups may be in one or more of the following ways:

In an environment where one mobile network operator (MNO) and one or more mobile virtual network operators (MVNOs) utilize the same spectrum, users may be grouped according to their network operator subscriptions, Users may be grouped according to their service subscription profiles, Users may be grouped according to their geography and time specific radio resource reservation requests, Flows of users may be grouped according to flow profiles where a flow profile includes but is not limited to the following: flow type, flow header contents, over-the-top service provider identity.

In the invention, the virtual medium access control layers (vMACs) for all existing service groups run on top of the physical mobile operator's medium access control layer. In a base station, one or more vMACs may be programmatically invoked, modified or terminated at a given time. Virtualizing the MAC layer into multiple distinct slices as vMACs provides the same semantics to each network operator or service provider controlling one or more such service groups as if they were the sole operator to conduct scheduling.

In the state-of-the-art cellular wireless networks, the scheduler running on a base station decides on which users to serve at a given time, and maps the head-of-line packets of the scheduled user flows to wireless resource blocks (RBs) that are available. In the invention, there may exist multiple vMACs present on a base station. Each vMAC is allocated a portion of the wireless resources available at the base station and runs its own scheduler which is responsible for deciding which of its subscriber flows are to be served on its allocated portion of the wireless resources.

Rather than allocating the actual physical resources to the individual vMACs, the invention describes a system where the underlying MAC allocates virtual resource blocks (vRBs) to the vMACs. In the invention, the mapping of these vRBs to the physical RBs is decoupled from the individual schedulers of the vMACs and is conducted by the underlying MAC of the base station. In the system, the scheduler of each vMAC maps the head-of-line packets of the scheduled user flows to the vRBs that it governs. Once the decisions on how to utilize the virtual resources are complete for each vMAC, the underlying MAC conducts the vRB to physical RB mapping.

In the cellular system of the invention, each user equipment (UE) sends channel state information (CSI) feedback to the serving base station. This feedback may be one single CSI value valid for the entire set of RBs, or may include a distinct CSI value for each RB. It is also possible to have multiple CSI values, each valid for a group of RBs. In the case where the CSI values received have coarser granularity than per RB, the base station may conduct interpolation to estimate per RB CSI values for the UE.

In the system of the invention, upon receiving the CSI feedback, and optionally conducting interpolation to estimate the per CSI values for all users, the underlying MAC computes a virtual channel state information (vCSI) for each service group subscriber and shares this information with the corresponding vMAC. This value is used by the vMAC scheduler in deciding which flows to service at a given time. Each service group subscriber has a single vCSI value that is common for all vRBs that the service governs. Thus, the scheduler simply decides on who gets serviced and how many RBs it is to use using a function that depends on the vCSI values as well as other quantitates. As far as the scheduler is concerned, it does not matter, for example, if the head-of-line packet of a flow is mapped to vRB-1 or vRB-2.

The invention discloses a method and apparatus for sharing wireless resources among multiple service groups. The MNO is responsible for assigning virtual resource blocks (vRBs) to each service group. The service groups lease vRBs for a limited time period and may pay a monetary fee per vRB as specified by the MNO. Each service group dynamically schedules its own traffic flows on one or more of the vRBs that it leases. Each service group utilizes virtual channel state information (vCSI) provided by the MNO for each active subscriber device of the said service group to perform channel aware scheduling.

The invention discloses methods and apparatus for a base station to compute the vCSI information per subscriber as well as methods and apparatus to map the vRBs to RBs in the presence of multiple vMACs, such that regardless of service group scheduling decisions, the vRBs to physical RB mapping feasible with service guarantees. The vCSI information might be different from one user of the service group to another user of the same service group. Although, the actual CSI per user might be different for different physical resource blocks, MNO provides one vCSI value for all the vRBs for a specific user. This simplifies the vRB scheduling decisions as well as vRB to RB mapping as follows. From the service group point of view, it only needs to decide on the number of vRBs to allocate to each flow in each scheduling interval and can assign arbitrary vRBs to these flows up to the said number of vRBs. The MNO can map the vRBs to physical RBs in such a way that the data rate advertised for the CSI associated with the vRB for a user is different than the actual transmission data rate with the assigned RB.

The method disclosed herein is composed of three stages:
1. Based on the number of vRBs that each service group has reserved as well as the per RB CSI value for each UE, the underlying MAC first computes the vCSI values for all UEs of all service groups and shares these with the corresponding vMACs.
2. Using the vCSI values, the vMACs conduct channel-aware scheduling and map head-of-line packets of scheduled users to vRBs.
3. The underlying MAC conducts conflict-free vRB to RB mapping for all service groups jointly.

The existing state of the art on mobile network virtualization has the MNO who owns the base station handle the physical layer transmission and medium access control, while MVNOs on top, set flow priorities, reserve bandwidth, or configure the protocol stack on the data plane nodes. As such MVNOs cannot take advantage of varying channel qualities of their individual subscribers.

This invention enables a simple virtualization framework, where not only MVNOs, but also any service groups that are formed, can make channel aware resource block assignments to take advantage of multi-user diversity while most of the underlying physical layer states are hidden from them. The invention also gives flexibility to the MNO to dynamically assign physical resource blocks to each service group or MVNO.

In one embodiment, the present invention discloses a communication architecture for medium access control (MAC) layer virtualization comprising: a MAC layer, a plurality of physical resource blocks (RBs) associated with the MAC layer, a plurality of virtual medium access control (vMAC) layers, each vMAC layer corresponding to a separate service group, where each service group programs its own scheduling logic in each vMAC instance, a plurality of virtual resource blocks (vRBs) associated with each vMAC layer, the vRBs filled with data packets according to the scheduling logic in each vMAC instance. In this embodiment, the MAC layer virtualizes the RBs as vRBs and assigns them to each vMAC layer.

In an extended embodiment, the channel state information (CSI) is received via a feedback from user equipment (UE) to the MAC layer, the MAC layer translating per UE per RB CSI into per RB virtual CSI (vCSI) and forwarding vCSI to corresponding vMAC, where the corresponding vMAC's scheduler conducts scheduling to fill vRBs with head of line packets using at least vCSI, with vRBs allocations being passed on to the MAC layer and the MAC layer conducts vRB to RB mapping so that the head of line packets are transmitted over actual, physical RBs.

In an extended embodiment, the CSI feedback by the UE is for a few channels and the MAC layer uses interpolation to estimate the CSI for each resource block.

In an extended embodiment, a channel quality indicator (CQI) is used as the CSI, where a higher CQI value indicates a better channel condition and a modulation and coding scheme with higher rate.

In one extended embodiment, for a UE of service group (SG) i, its $N_{SGi}$'th sorted CQI value (e.g., sorted in an ascending or descending manner) is selected as its vCSI value.

In another extended embodiment, for a UE of service group (SG) i, the average of its top $N_{SGi}$ sorted CQI values (e.g., sorted in an ascending or descending manner) is selected as its vCSI value.

In an extended embodiment, where each UE reports its channel measurements in the form of CSI to a mobile network operator's (MNO's) base station, the MAC layer of the base station then provides virtual CSI (vCSI) values to the vMAC instance of each service group for each UE accessing services of the service group, and the vMAC instance then conducts its own scheduling to compute the number of vRBs assigned to each of its traffic flows based on the vCSI, flow profiles, and quality of experience/service objectives.

In an extended embodiment, where, for each scheduled user k, resource blocks are sorted with respect to $CSI_{k,RB}$ in descending order and top $n_k$ RBs in ordered in $CSI_{k,RB}$ are assigned to user k.

In an extended embodiment, where, when conflicts arise when a given physical RB is tentatively mapped to multiple different vRBs, and for each user sharing the conflicting RB, the next best unassigned r* is picked from their ordered list as the RB candidate, with user, UE, with a smallest $CSI_{UE,r*}$ value being assigned the conflicting RB, and the remaining users that share the conflicting RB being assigned their next best unassigned r*.

In an extended embodiment, where, when conflicts arise when a given physical RB is tentatively mapped to multiple different vRBs and for each user sharing the conflicting RB, the next best unassigned r* is picked from their ordered list as the RB candidate, with user, UE, with a largest difference, ($vCSI_{UE} - CSI_{UE,r*}$), being assigned the conflicting RB and the remaining users that share the conflicting RB being assigned their next best unassigned r*.

The present invention also provides an article of manufacture comprising non-transitory computer storage medium storing computer readable program code which, when executed by a computer, implements medium access control (MAC) layer virtualization comprising: computer readable program code implementing a MAC layer, computer readable program code implementing a plurality of physical resource blocks (RBs) associated with the MAC layer, computer readable program code implementing a plurality of virtual medium access control (vMAC) layers, each vMAC layer corresponding to a separate service group, where each service group programs its own scheduling logic in each vMAC instance, computer readable program code implementing a plurality of virtual resource blocks (vRBs) associated with each vMAC layer, the vRBs filled with data packets according to the scheduling logic in each vMAC instance. In this embodiment, the MAC layer virtualizes the RBs as vRBs and assigns them to each vMAC layer.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 3 illustrates an example of control plane and data/user plane split in the virtual MAC and physical MAC layers as well as the interfaces in between.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Figure 1:
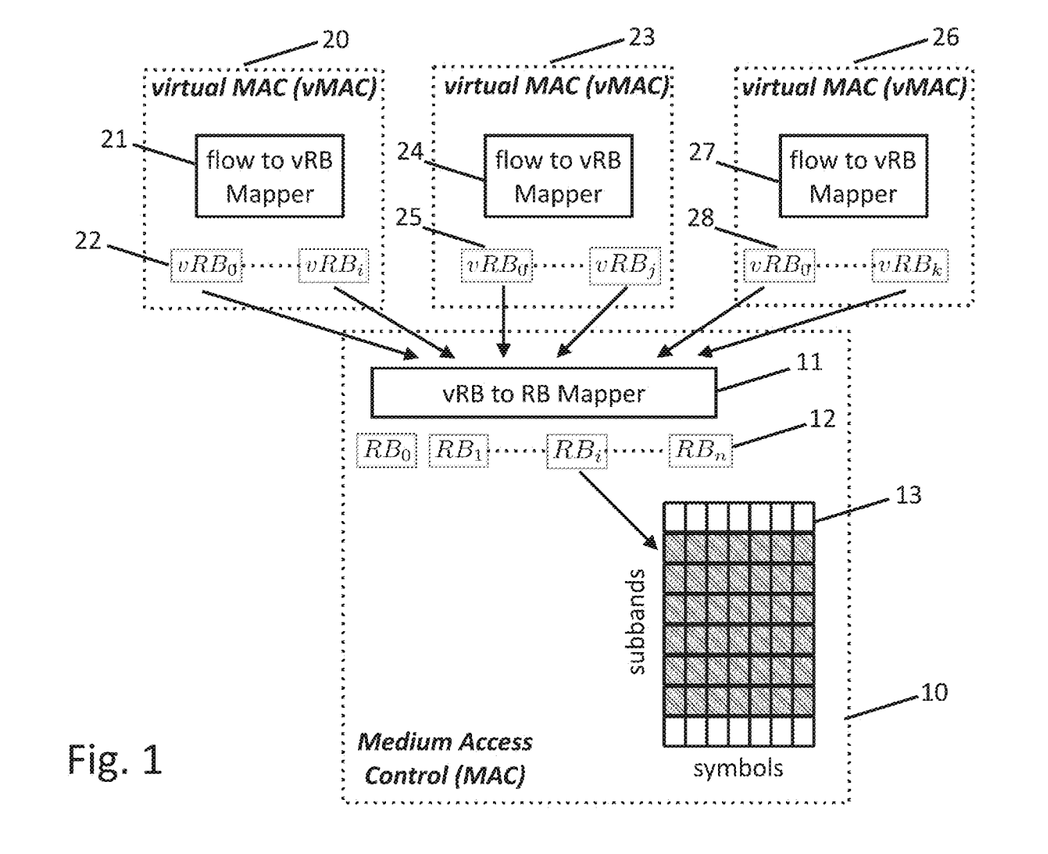
FIG. 1 illustrates the architecture for MAC layer virtualization disclosed by the present invention.

FIG. 1 illustrates the architecture for MAC layer virtualization disclosed by the invention. The MNO provides the Medium Access Control layer (10) and has full control over which resource block maps (12) to the wireless channels (13). This mapping is typically described in wireless standards. In FIG. 1, wireless channels are two-dimensional resources with orthogonal time slots and frequency sub-bands as in the case of LTE systems. It suffices to say that the invention covers any other channelization strategies (orthogonal or non-orthogonal channels) without loss of generality. MAC (10) has a fixed number of resource blocks. Unlike traditional systems, where MAC layer assigns resource blocks directly to wireless user equipment (UE), MAC layer in this invention assigns physical resource blocks (RBs) to virtual Resource Blocks (vRBs). Block 11 in FIG. 1 depicts this stage, i.e., vRB to RB Mapper. The mapping logic and strategy depends on the type of services, guarantees, and other optimization objectives the MNO determines. The MAC layer virtualizes its resource blocks and assigns vRBs to virtual MAC layers are based on the service level agreements for the corresponding service groups. In FIG. 1, as an example, three vMAC slices (20, 23, 26) are shown each belonging to a separate service group. Furthermore, in the example, vMAC slice (20) is allocated (i+1) vRBs, vMAC slice (23) is allocated (j+1) vRBs, and vMAC slice (26) is allocated (k+1) vRBs. The vMAC slices are unaware of each other and from their point-of-view, they are the sole user of the resource blocks. The enumeration of the vRBs (22, 25, 28 in FIG. 1) assigned to each vMAC can be overlapping (or the same). It is the MAC layer's responsibility to uniquely identify each vMAC container and distinguish between the vRBs of distinct vMACs that use the same ID space. Each vMAC is responsible for mapping the traffic flows of their subscribers onto the vRBs assigned to them by the MAC layer. The scheduling decisions taken in (21), (24), (27), and the vRB to RB mapping decision taken in (11) jointly determine which flow packets are assigned to which RB and hence the wireless channels.

Figure 2:
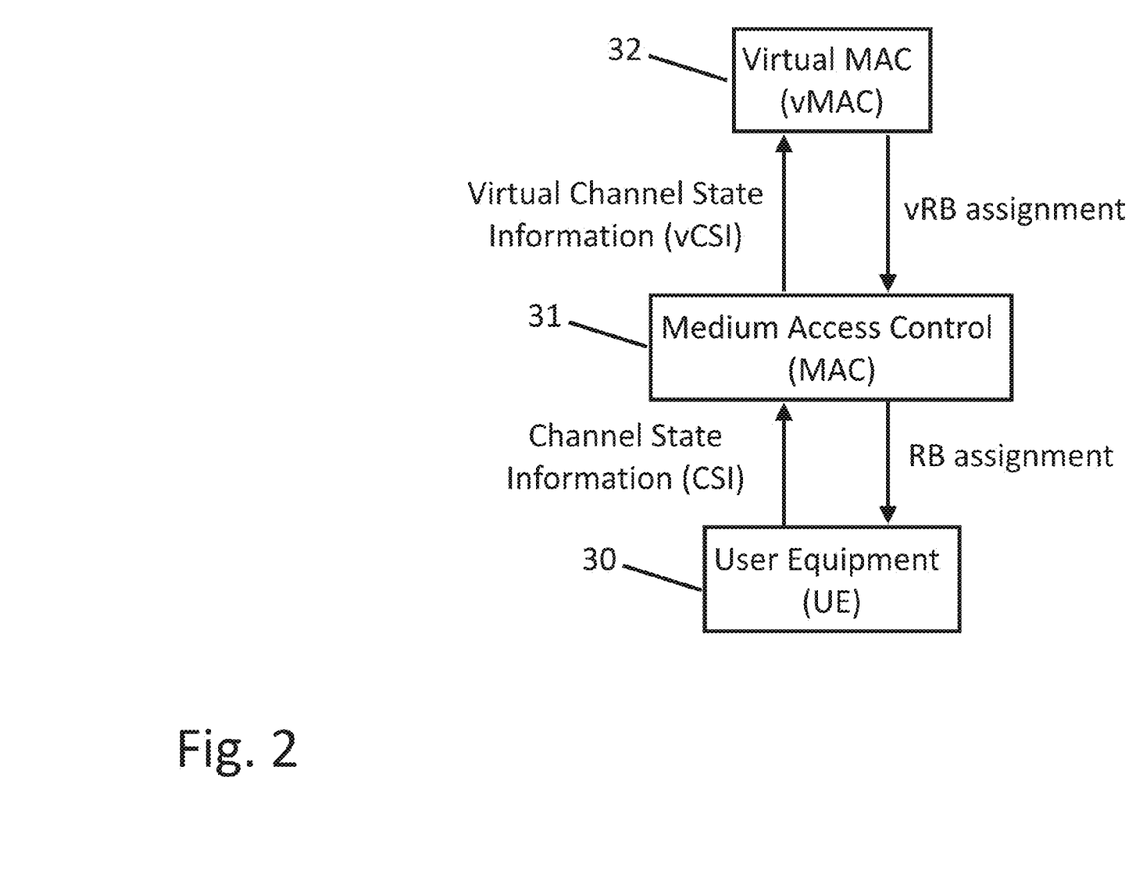
FIG. 2 depicts how Channel State Information (CSI) is feedback from UE to the MAC layer, and then to an instance of a vMAC.

FIG. 2 depicts how Channel State Information (CSI) is feedback from UE (30) to the MAC layer (31), and then to an instance of a vMAC (32). The CSI feedback by the UE may be for few channels (e.g., subband and time slots) and the MAC layer may interpolate these values to estimate the CSI for each resource block. The MAC layer transforms per UE per RB CSI into per UE virtual CSI (vCSI) for each vMAC instance. The vCSI along with the queue states of UEs and QoS classes of traffic flows determine how each vMAC makes assignment decisions for its own traffic flows. In the figure, the vMAC instance (32) informs the underlying MAC instance (31) about which vRBs are assigned to each of its traffic flows. The MAC instance (31) finalizes the RB assignment to each traffic flow and conducts wireless transmissions accordingly.

Figure 3:
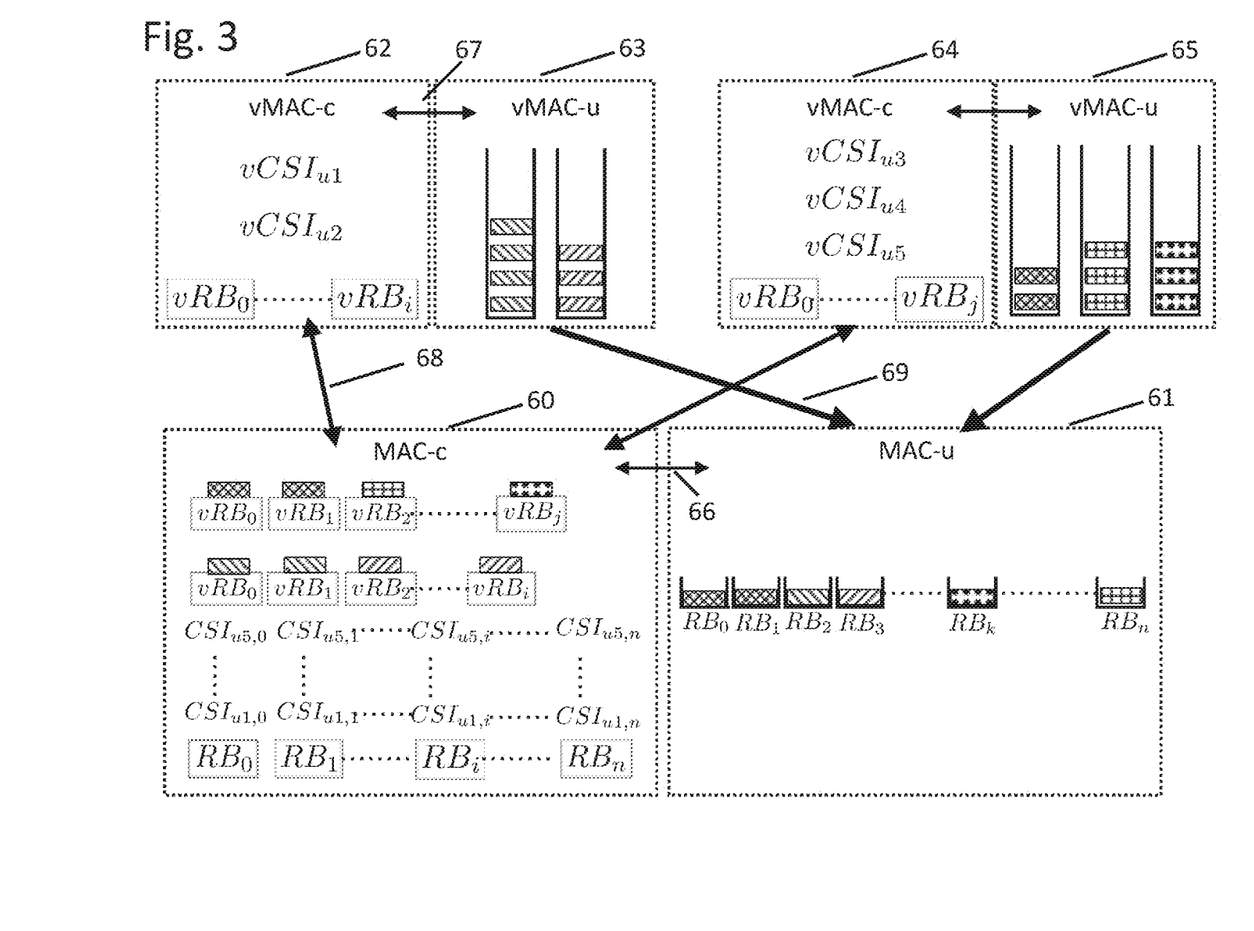

FIG. 3 illustrates an example of control plane and data/user plane split in the virtual MAC and physical MAC layers as well as the interfaces in between. The control plane of vMAC (vMAC-c) and user plane of vMAC (vMAC-u) together constitute the vMAC for a given service group. FIG. 3 shows two vMACs that belong to two service groups. The first vMAC is comprised of (62) and (63), the second vMAC is comprised of (64) and (65). Similarly, the control plane of MAC (MAC-c) and user plane of MAC (MAC-u) constitute the MAC layer of MNO illustrated as (60) and (61) in FIG. 3, respectively. The vMAC-c has knowledge of the vRBs assigned to its service group by the MAC-c. The assigned vRBs have common per user channel state information. In FIG. 3, per user channel state information is shown as $vCSI_{ui}$ representing the virtual CSI for user $u_i$. $vCSI_{ui}$ is provided by MAC-c to each of vMAC-c. According to FIG. 3, the first vMAC has two active flows and the second vMAC has three active flows. vMAC-u performs buffer management for these flows and share buffer state as well as flow information with vMAC-c through an internal interface (e.g., 67 in FIG. 3). Using its own scheduling algorithm, each vMAC-c performs flow to vRB assignment based on $vCSI_u$ and flow information and informs MAC-c about these assignment decisions. The MAC-c, with the knowledge of flow assignment decisions to vRBs assigned to each vMAC and using the per resource block CSI information for each user ($CSI_{ui,j}$), makes the final assignment of resource blocks to individual flows and communicates this decision with an internal interface (66) to MAC-u. The MAC-u then directly pulls the packets from each vMAC-u based on the assignment by MAC-c to fill the transmission buffers for each resource block.

Figure 4:
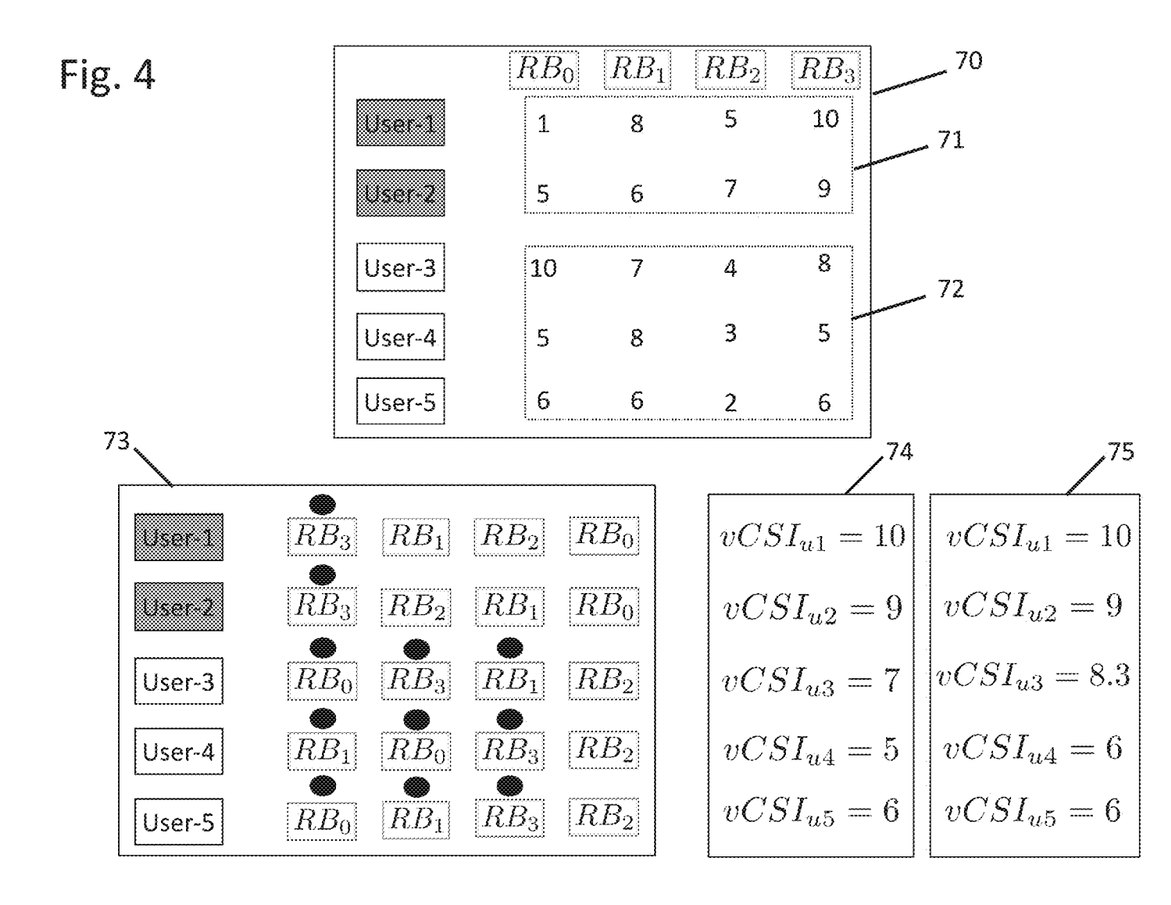
FIG. 4 illustrates an example of how the per-UE vCSI is computed in the present invention.

FIG. 4 illustrates how the per-UE vCSI is computed in the invention using an example. In the example, the Channel Quality Indicator (CQI) is used as the main CSI indicator. The higher CQI value indicates a better channel condition and a modulation and coding scheme with higher rate. Typically there are as many CQI levels as the transmission modes supported by a given wireless system standard. The per RB CQI value for each user may be received as feedback from said user, or alternatively, may be estimated using interpolation of the feedback received. The example assumes that there are two service groups with two distinct vMACs. Furthermore, the example considers a wireless network with 4 RBs: $RB_0$ through $RB_3$. Table (70) lists the CQI information for all users for all RBs, grouping the users according to their service group memberships as (71) and (72). Block (73) shows the sorted list of RBs in descending order based on CQI values for each user. For the purposes of illustration, the first service group is assigned $N_{SG1}=1$ vRB and the second service group is assigned $N_{SG3}=3$ vRBs, where $N_{SGi}$ is the number of vRBs leased by the service group i. Block (73) shows black circles on top of highest $N_{SGi}$ RBs tentatively assigned to each user for service group i. Blocks (74) and (75) show two different ways of computing vCSI from the tentatively assigned RBs as described in this invention. In (74), for a UE of service group i, its $N_{SGi}$'th sorted CQI value is selected as its vCSI value. Alternatively, in (75), for a UE of service group i, the average of its top $N_{SGi}$ sorted CQI values is selected as its vCSI value.

Figure 5A:
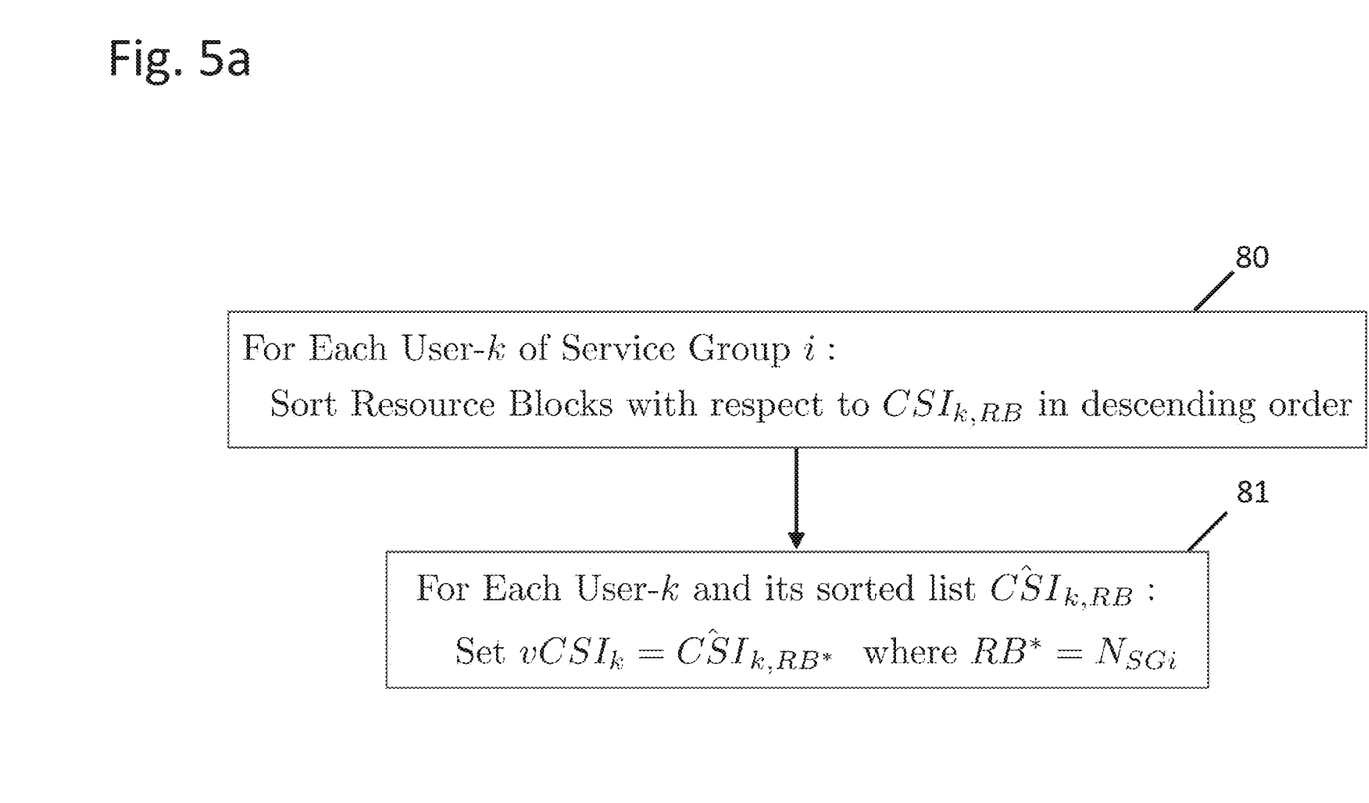
FIGS. 5A and 5B illustrate the block diagrams of the two alternate methods of the present invention.
Figure 5B:
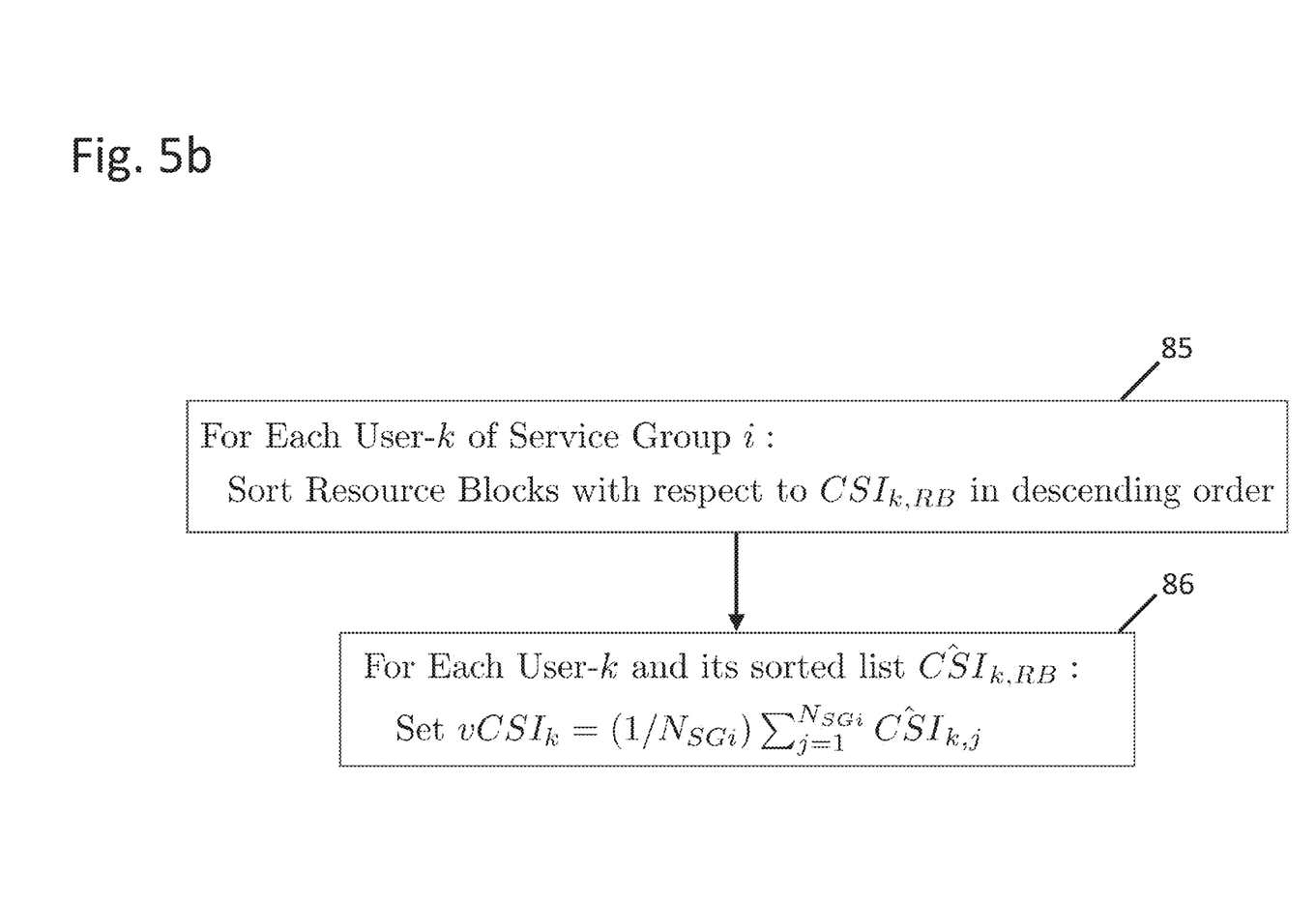

FIG. 5a and FIG. 5b present the block diagrams of the two alternate methods of the invention, which are also explained using an example in FIG. 4 for computing $vCSI_u$ for user u. For user k of service group i, the method described in FIG. 5a requires the MAC to sort the per RB CSIs to obtain the sorted CSI array, $\hat{CSI}_{k,RB}$ (80). When service group i is assigned $N_{SGi}$ vRBs, the vCSI of user k, $vCSI_k$ is set as the $N_{SGi}$'th value in the sorted CSI array (81). For the same user, the alternate method described in FIG. 5b requires the MAC to sort the per RB CSIs to obtain the sorted CSI array, $\hat{CSI}_{k,RB}$ (85) as before. However, now, when service group i is assigned $N_{SGi}$ vRBs, the vCSI of user k, $vCSI_k$ is set as the average of the top $N_{SGi}$ values in the sorted CSI array (86).

Figure 6A:
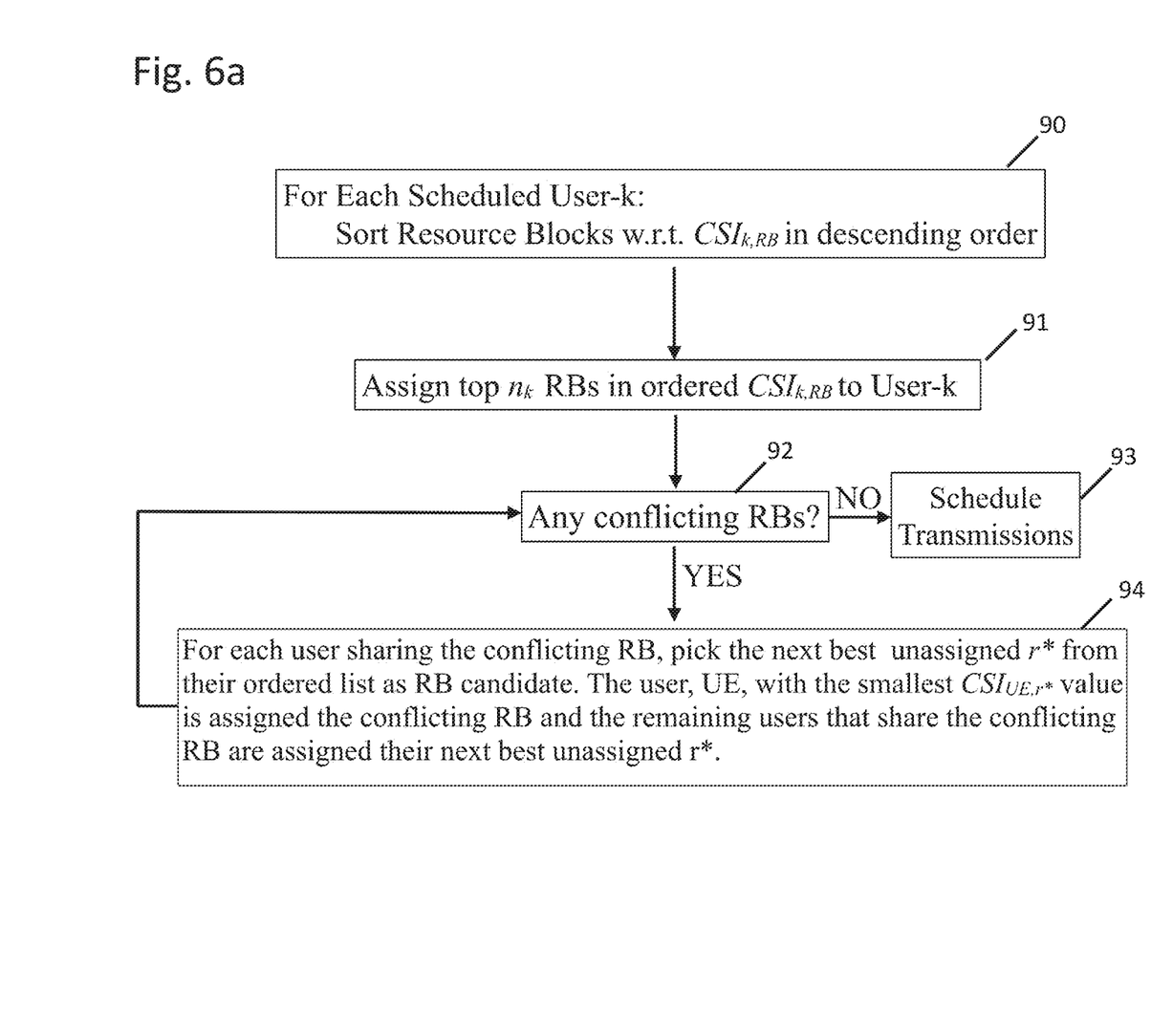
FIGS. 6A and 6B show the block diagrams of the methods of the invention for vRB to RB mapping performed by each MAC instance.
Figure 6B:
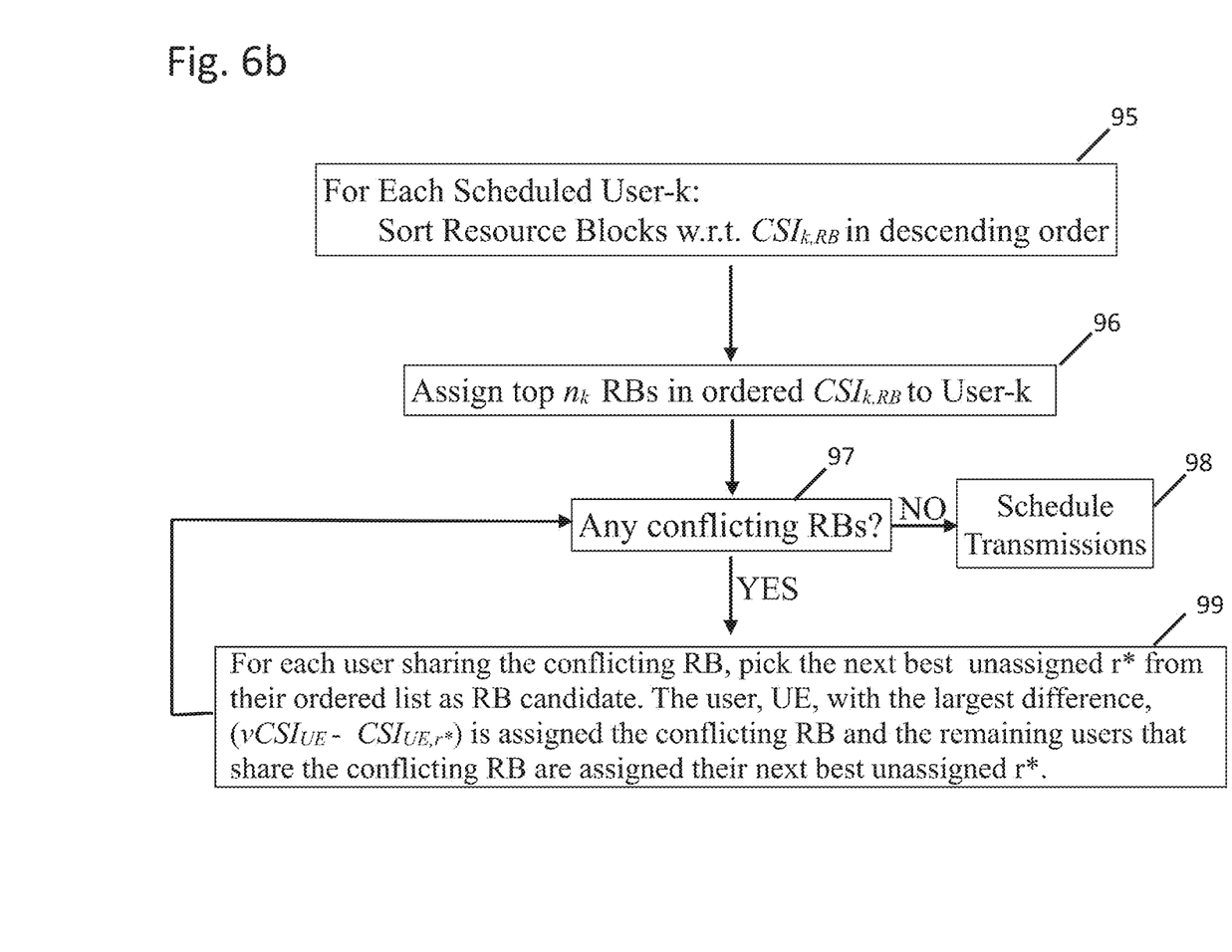

FIG. 6a and FIG. 6b show the block diagrams of the methods of the invention for vRB to RB mapping performed by each MAC instance. The method of FIG. 6a is also explained using an example in FIG. 7. Both methods require the mapper to create a sorted list of RBs for each scheduled user with respect to their descending $CSI_{k,RB}$ values as shown in block (90) in FIG. 6a and block (95) in FIG. 6b, and assign physical RBs using this sorted list as shown in block (91) in FIG. 6a and block (96) in FIG. 6b. The mapping may result in conflicts as queried in block (92) in FIG. 6a and block (97) in FIG. 6b. If there are no conflicts, the assignments are confirmed as shown in block (92) in FIG. 6a and block (97) in FIG. 6b. If there are conflicts, an iterative conflict resolution stage is necessary. This is where the two methods in the invention differ. The details of the conflict resolution stage for both methods are given in blocks (94) and (99), respectively.

Figure 7:
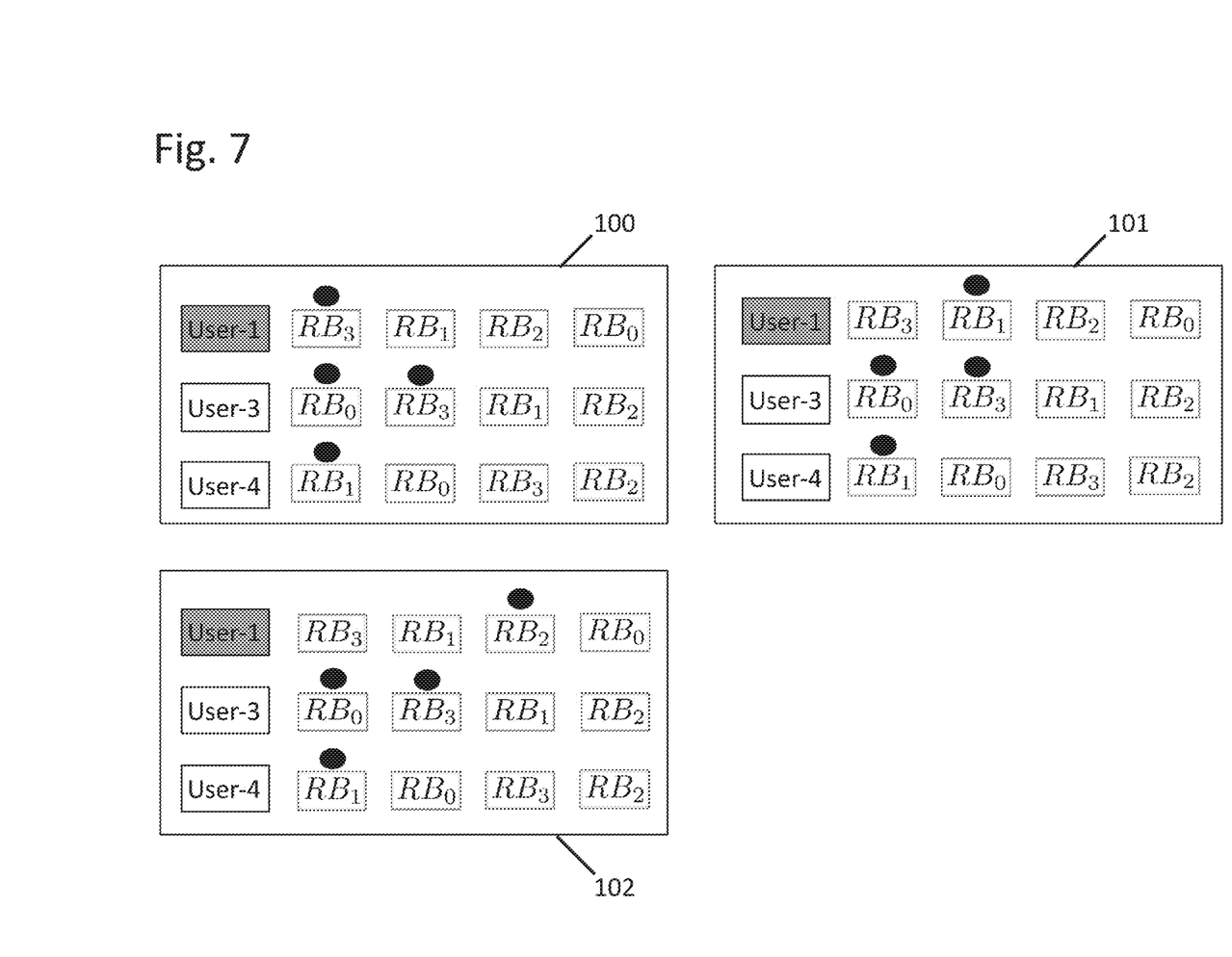
FIG. 7 illustrates an example of execution of the method of FIG. 6A building on the example FIG. 4.

FIG. 7 shows an example of execution of the method of FIG. 6a building on the example in FIG. 4. In the figure, block (100) gives the ordered RB list for the scheduled users. In the example, we assume that the scheduler of Service Group-1 has assigned 1 vRB to User-1 and the scheduler of Service Group-2 has assigned 2 vRBs to User-3, and 1 vRB to User-4. The mapper tentatively conducts mapping so that the highest possible data rates are achievable for each user. This is illustrated using black circles on top of the tentatively assigned RBs for each user. Initially, $RB_3$ creates a conflict between User-1 and User-3. The conflict resolution phase of the method iteratively creates alternative vRB to RB mapping rules as shown in blocks (101) and (102). Since block (102) show no remaining conflicts, the mapping, which is illustrated using black circles on top of the assigned RBs for each user, is confirmed.

A typical embodiment of the invention provides a specific architecture for wireless network virtualization as depicted in FIG. 1. In this virtualization architecture, the MNO is responsible for providing medium access control (MAC) and wireless transmission as well as reception at each base station. The MNO virtualizes the medium access control by instantiating vMAC slices within a base station for distinct service groups serving their own users over the same physical network. The service groups may be composed of a multiple number of vMAC slices, one at each distinct base station in a given geography. Each service group leases wireless resources in a base station quantified in units of virtual resource blocks (vRB). In FIG. 1, three such service groups and their respective vMACs (20, 23, 26) are shown as examples. The first service group with vMAC (20) leases (i+1) vRBs, the second service with vMAC (23) leases (j+1) vRBS, and the third service with vMAC (26) leases (k+1) vRBs. Each service group directly controls how their leased vRBs are allocated to the individual traffic flows. In one embodiment, some of these service groups can be MVNOs where users explicitly subscribe to these MVNOs. In another embodiment, some of these services can be MNO provided services that require subscription of individual users to gain explicit subscription. In another embodiment, some of these service groups may be formed by the MNO for specific purposes. For example, the MNO may form a service group to establish a Public Safety Network, or may form a service group to service only Machine Type Communications, or simply to support video flows in a separate RAN slice. One user can simultaneously belong to one or more of these service groups, thus different traffic flows of the same user can go through distinct vMACs. To allocate vRBs to individual traffic flows, each vMAC runs its own scheduling algorithm. Each service group programs its own scheduling logic in its respective vMAC instance. Different vMACs can utilize the same or different scheduling algorithms. In FIG. 1, the boxes (21), (24), and (27) labeled "Flow to vRB Mapper" runs these scheduling logics. The MAC layer in the base station (e.g., 10 in FIG. 1) of the MNO is then responsible for mapping these vRBs onto one or more RBs (e.g., 11 in FIG. 1). Each RB corresponds to a particular set of wireless channels (e.g., sub-bands and time slots as in 13 in FIG. 1).

As an essential part of the invention, channel state information (CSI) must be collected and conveyed to service groups for their respective subscribers. FIG. 2 shows steps involved in the process. Each UE (e.g., 30 in FIG. 2) reports their channel measurements in the form of CSI to the base station of the MNO (e.g., 31 in FIG. 2). The MAC layer of the base station then provides virtual CSI (vCSI) values to the vMAC (e.g., 32) instance of each service group for each of the UEs accessing the services of said service group. The vMAC then conducts its own scheduling to compute the number of vRBs assigned to each of its traffic flows based on the vCSI, flow profiles, and quality of experience/service objectives. The vMACs of the service groups then pass the vRB assignment details back to the MAC, which in return finalizes the actual physical RB allocation for individual UEs and/or traffic flows.

In a typical embodiment, the control and user plane of both MAC and vMAC layers are decoupled from each other, where the control plane monitors the queue, flow, channel states and makes scheduling decisions while the user plane processes the byte streams from each flow and carries out the wireless transmission/reception. In FIG. 3, the decoupling of MAC into MAC-c and MAC-u, the decoupling of vMAC into vMAC-c and vMAC-u, and the interfaces between each entity are shown. MAC-c has per-UE, per-RB channel state information, $CSI_{UE,RB}$. $CSI_{UE,RB}$ can be obtained via measurements at the base stations, reports by the UEs, and interpolation. In the preferred embodiment, the MAC layer provides each vMAC only per user vCSI (e.g., $vCSI_{u1}$, $vCSI_{u2}$ for the two users of vMAC (62) in FIG. 3). The-per user vCSI is the same for all vRBs allocated to the said vMAC. Thus, vMAC only decides how many of its vRBs are allocated to which flows.

The main methods for computing the vCSI values in the embodiment are shown in FIG. 5a and FIG. 5b and an example to highlight the steps is illustrated in FIG. 4. The inputs to the procedure are the per-UE, per-RB CSI values, $CSI_{UE,RB}$, and the number of vRBs leased by a given service group, $N_{SG}$. The output is the $vCSI_{UE}$ values for each UE. In a typical embodiment, the first step (block (80) in FIG. 5) of the process sorts $CSI_{UE,RB}$ for each UE with active traffic flows. Block (70) in FIG. 4 shows in tabular form the most recently reported CSI values for five users (User-1 through User-5) and four physical resource blocks ($RB_0$ through $RB_3$). In the example, User-1 and User-2 utilize a first service group as shown in block (71), whereas User-3, User-4, and User-5 utilize a second service group as shown in block (72). In the example, the first service group has $N_{SG1}=1$ leased vRB, and the second service has $N_{SG2}=3$ leased vRBs. In the procedure of the invention, the MAC sorts the resource blocks with respect to their corresponding $CSI_{UE,RB}$ values for each user as shown in block (80) in FIG. 5a and block (85) in FIG. 5b, to obtain a sorted list as shown in block (73) in FIG. 4. For a Service Group-i user UE, its CSI values for the top $N_{SGi}$ RBs are used to determine its vCSI value, $vCSI_{UE}$. These RBs are illustrated with black circles above them in block (73) in FIG. 4 indicating a tentative RB assignment to the UEs for the purpose of vCSI value computation. In block (81) in FIG. 5a, the minimum CSI value of these top $N_{SGi}$ RBs are used as one embodiment. The corresponding computation in the example of FIG. 4 is provided in block (74). In another embodiment, rather than the minimum CSI value, the average CSI value of top $N_{SGi}$ RBs is used for computing the $vCSI_u$ values. This is shown in block (86) in FIG. 5b and the corresponding computation in the example of FIG. 4 is provided in block (75). The critical point in the invention is that at the vCSI computation stage, we allow the same RB to be tentatively assigned to multiple users. For example, $RB_3$ is tentatively assigned to all users according to (73) in FIG. 4.

Once the $vCSI_{UE}$'s are computed by the MAC and passed onto the relevant vMAC instances, each vMAC instance performs scheduling decisions based on these $vCSI_{UE}$ values. For example, a vMAC instance can execute proportionally fair scheduling (PFS), where each user is prioritized during the scheduling by the vMAC instance according to the PFS metric computed as Rate-Function $(vCSI_{UE})/T_{UE}$. Here, Rate-Function(x) is the mapping used by physical network operator to decide on the transmission rate (or equivalently transport block size) for each RB at a CSI value equal to the $vCSI_{UE}$ and $T_{UE}$ is the average throughput User-UE has been served with until the current scheduling interval. $T_{UE}$ can be computed as window-averages or a discounted moving average of past transmission rates utilized for User-UE at each scheduling interval including the zero rates (i.e., user is not scheduled). The higher the PFS metric is, the more priority a user receives in the scheduling decision. In one embodiment, $T_{UE}$, is computed as the real throughput received by the user after the MNO decides on the actual flow to RB mapping as well as the transmission rate. In such a case, MNO provides the delivered rate for each user in the last transmission slot to vMAC instances. Alternatively, $T_{UE}$ can be taken as strictly a virtual throughput value where vMAC instances assume that MNO will provide a transmission rate to User-UE according to the advertised $vCSI_{UE}$ value. Clearly, the invention described herein is not limited to the PFS algorithm, but is applicable to any scheduling algorithm that a service group desires to use. A vMAC is even free to disregard the advertised $vCSI_{UE}$ values. For example, a vMAC instance can simply run Round-Robin scheduling for its users. A vMAC instance can make scheduling decisions solely based on the $vCSI_{UE}$ values too, for instance, by allocating all the vRBs to the user with the highest $vCSI_{UE}$ value. A vMAC instance may also use a priority index that multiplies the queue backlog with the instantaneous rate supportable at the advertised $vCSI_{UE}$ value, providing higher priority to the users with larger priority indices. For the invention to be particularly useful, the vMAC instance must run a channel-aware scheduler that utilizes $vCSI_{UE}$ in the scheduling decisions.

In the method of the invention, once the scheduler of each vMAC decides on how many vRBs are allocated for which user or traffic flow, it passes this information to the MAC layer of the base station. A critical component of the method is the "vRB to RB Mapper" as shown in block (11) of FIG. 1 which maps the vRBs scheduled by the vMAC schedulers to actual physical RBs. The mapper ensures that the mapping is conflict free. Two typical embodiments of the "vRB to RB Mapper" are described in FIG. 6a and FIG. 6b and building on the example given in FIG. 4, a corresponding example of the mapping method is provided in FIG. 7. Note that, if the service blocks that are defined in the network are flow-based, it is possible for a user to get scheduled by multiple vMAC schedulers, and be assigned one or more vRBs from each of these schedulers at the same time.

In the first step of the vRB to RB mapping methods of the embodiment as shown in blocks (90) in FIG. 6a and (95) in FIG. 6b, the mapper considers only the scheduled flows from the vMACs, and orders the resource blocks for each scheduled user with respect to the CSI value of said user, $CSI_{UE,RB}$. Then, a user, say user-UE, which is assigned $n_{m,UE}$ vRBs by Service Group-m is tentatively assigned its top $n_{UE}=\Sigma_{UE}n_{m,UE}$ physical RBs by the mapper where the summation is over all service groups that UE belongs in the base station of interest. This is shown in block (91) of FIG. 6a and in block (96) of FIG. 6b. As a result of this step, potential conflicts may arise, and a given physical RB may be tentatively mapped to multiple different vRBs. If no conflicts exist, as queried in block (92) in FIG. 6a and block (97) in FIG. 6b, the mapping is complete. This is shown in block (93) in FIG. 6a and block (98) in FIG. 6b. Otherwise, the methods of the invention iteratively resolve each such conflict as follows. First, the methods identify the next RB, r*, with the highest $CSI_{UE,r*}$ value in the ordered list for each UE that is in conflict. In one embodiment, as shown in (94) in FIG. 6a, the user with the smallest value of $CSI_{UE,r*}$ is assigned the RB in conflict so that greedily, the reduction in the minimum CSI value observed among users scheduled by all of the vMAC instances is kept at a minimum. All other conflicting users are assigned their next RBs, r*, in their respective ordered lists. If the smallest value is observed for multiple users, the user with the smallest value of CSI next on its ordered list is assigned the conflicting RB. In another embodiment, as shown in (99) in FIG. 6b, the user-UE with the maximum difference, $(vCSI_{UE}-CSI_{UE,r*})$ is assigned the RB in conflict so that the actual CSI value to be used in transmission is as close as possible to the advertised vCSI value for each scheduled user. All other conflicting users are assigned their next RBs, r*, in their respective ordered lists. If the maximum difference value is observed for multiple users, the user with the maximum difference value between its virtual CSI, $vCSI_{UE}$, and the CSI value next on its ordered list is assigned the conflicting RB. For both embodiments, every time block (94) in FIG. 6a or block (99) in FIG. 6b is executed, a new conflict may be generated requiring recursively the resolution of the conflict resolution blocks of (94) and (99), respectively, until no conflict remains. As long as the total number of vRBs to be scheduled is less than or equal to the physical number of RBs, the algorithms for both embodiments are guaranteed to converge. The two embodiments described above inherently assume that all Service Groups have equal priority. It is possible that the MNO assign priorities to the service groups. In a system where such priorities exist, the vRB to RB mapping method of the embodiment would initially follow the blocks of (90), (91), (92) and (93) of FIG. 6a. However, in case there is a conflict, the vRB to RB mapper would keep the mapping rule for the service group with highest priority and would assign all other conflicting users their next RBs, r*, in their respective ordered lists. In the case of a conflict between the tentative mapping rules for two equal priority service groups, the mapper would follow block (94). In yet another embodiment, the mapper would follow block (99) in such an event.

FIG. 7 shows execution of method described in FIG. 6a building on the example case described in FIG. 4 to compute $vCSI_{UE}$ values. Note that block (100) is simply a condensed version of block (73) from FIG. 4. In (100), only the scheduled users are listed. In the example, let us assume that the scheduler of Service Group-1 has assigned 1 vRB to User-1 and the scheduler of Service Group-2 has assigned 2 vRBs to User-3, and 1 vRB to User-4. This is illustrated in block (100) using black circles on top of the RBs with the highest CSI values in the users' ordered RB lists. Initially block (100), $RB_3$ creates a conflict between User-1 and User-3. According to block (101), the conflict is resolved in favor of User-3. Therefore, $RB_3$ is assigned to User-3, $RB_3$ is removed from the tentative assigned list of User-1 and replaced by $RB_1$ (block 101). In this iteration, User-1 and User-4 are in conflict due to $RB_1$. The conflict is resolved in favor of User-4 and User-1 is instead tentatively assigned $RB_2$ as its best next RB block (102). The last step resolved all the conflicts and as a final result User-1 is assigned $RB_2$, User-3 is assigned $RB_0$ and $RB_3$, and User-4 is assigned $RB_1$. With this final assignment, note that User-1 ends up with an actual CSI value of 5 despite the fact that its advertised vCSI values was 10. User-3 receives an average CSI value of 9 and User-4 receives a CSI value of 8, both of which are higher than the advertised vCSI values in block (74). Thus, as a critical part of the invention, it is the MNO that finally decides on the coding and modulation scheme and MIMO technique rather than the vMAC based on the actual CSI values of the final assignment.

In a typical embodiment, the MNO keeps track of the advertised versus actual rates for vRBs to change the prioritization in resolving conflicts. In other words, the higher the accumulated difference in advertised rate and actual rate, the higher priority is assigned. In another embodiment, the MNO keeps track of the average rate supported per vRB for each service provider to prioritize between service providers in resolving conflicts. The service providers that have lower average rate per vRB are given higher priority.

The present invention also provides an article of manufacture comprising non-transitory computer storage medium storing computer readable program code which, when executed by a computer, implements medium access control (MAC) layer virtualization comprising: computer readable program code implementing a MAC layer, computer readable program code implementing a plurality of physical resource blocks (RBs) associated with the MAC layer, computer readable program code implementing a plurality of virtual medium access control (vMAC) layers, each vMAC layer corresponding to a separate service group, where each service group programs its own scheduling logic in each vMAC instance, computer readable program code implementing a plurality of virtual resource blocks (vRBs) associated with each vMAC layer, the vRBs filled with data packets according to the scheduling logic in each vMAC instance. In this embodiment, the MAC layer virtualizes the RBs as vRBs and assigns them to each vMAC layer.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a method and apparatus for virtual channel state information based wireless radio access network virtualization. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A communication architecture for medium access control (MAC) layer virtualization comprising:
a processor;
a storage comprising computer readable program code,
wherein the processor executes the computer readable program code to implement;
a MAC layer;
a plurality of physical resource blocks (RBs) associated with the MAC layer;
a plurality of virtual medium access control (vMAC) layers, each vMAC layer corresponding to a separate service group, where each service group programs its own scheduling logic in each vMAC instance;
a plurality of virtual resource blocks (vRBs) associated with each vMAC layer, the vRBs filled with data packets according to the scheduling logic in each vMAC instance, and
wherein the MAC layer virtualizes the RBs as vRBs and assigns them to each vMAC layer, and wherein channel state information (CSI) is received via a feedback from user equipment (UE) to the MAC layer, the MAC layer translating per UE per RB CSI into per RB virtual CSI (vCSI) and forwarding vCSI to corresponding vMAC, where the corresponding vMAC's scheduler conducts scheduling to fill vRBs with head of line packets using at least vCSI, with vRBs allocations being passed on to the MAC layer and the MAC layer conducts vRB to RB mapping so that the head of line packets are transmitted over actual, physical RBs.

2. The communication architecture of claim 1, the CSI feedback by the UE is for a few channels and the MAC layer uses interpolation to estimate the CSI for each resource block.

3. The communication architecture of claim 1, where a channel quality indicator (CQI) is used as the CSI, where a higher CQI value indicates a better channel condition and a modulation and coding scheme with higher rate.

4. The communication architecture of claim 3, wherein for a UE of service group (SG) i, its $N_{SGi}$'th sorted CQI value is selected as its vCSI value, the sorting done in an ascending or descending manner, where $N_{SGi}$ corresponds to a number of vRBs leased by the service group i.

5. The communication architecture of claim 3, wherein for a UE of service group (SG) i, the average of its top $N_{SGi}$ sorted CQI values is selected as its vCSI value, the sorting done in an ascending or descending manner, where $N_{SGi}$ corresponds to a number of vRBs leased by the service group i.

6. The communication architecture of claim 1, where each UE reports its channel measurements in the form of CSI to a mobile network operator's (MNO's) base station and the MAC layer of the base station then provides virtual CSI (vCSI) values to the vMAC instance of each service group for each UE accessing services of the service group, and where the vMAC instance then conducts its own scheduling to compute the number of vRBs assigned to each of its traffic flows based on the vCSI, flow profiles, and quality of experience/service objectives.

7. The communication architecture of claim 1, where, for each scheduled user k, resource blocks are sorted with respect to $CSI_{k,RB}$ in descending order, and a predetermined number of top ordered resource blocks (RBs) in $CSI_{k,RB}$, $n_k$, are assigned to user k.

8. The communication architecture of claim 7, where when conflicts arise when a given physical RB is tentatively mapped to multiple different vRBs, for each user sharing the conflicting RB, picking a next best unassigned candidate r* from their ordered list as RB candidate, with user, UE, with a smallest $CSI_{UE,r*}$ value is assigned the conflicting RB and the remaining users that share the conflicting RB are assigned their next best unassigned r*.

9. The communication architecture of claim 7, where when conflicts arise when a given physical RB is tentatively mapped to multiple different vRBs, for each user sharing the conflicting RB, picking a next best unassigned candidate r* from their ordered list as RB candidate, with user, UE, with a largest difference, $(vCSI_{UE} - CSI_{UE,r*})$, being assigned the conflicting RB and the remaining users that share the conflicting RB are assigned their next best unassigned r*.

10. An article of manufacture comprising non-transitory computer storage medium storing computer readable program code which, when executed by a computer, implements medium access control (MAC) layer virtualization comprising:
computer readable program code implementing a MAC layer;
computer readable program code implementing a plurality of physical resource blocks (RBs) associated with the MAC layer;
computer readable program code implementing a plurality of virtual medium access control (vMAC) layers, each vMAC layer corresponding to a separate service group, where each service group programs its own scheduling logic in each vMAC instance;

computer readable program code implementing a plurality of virtual resource blocks (vRBs) associated with each vMAC layer, the vRBs filled with data packets according to the scheduling logic in each vMAC instance, and wherein the MAC layer virtualizes the RBs as vRBs and assigns them to each vMAC layer, and wherein channel state information (CSI) is received via a feedback from user equipment (UE) to the MAC layer, the MAC layer translating per UE per RB CSI into per RB virtual CSI (vCSI) and forwarding vCSI to corresponding vMAC, where the corresponding vMAC's scheduler conducts scheduling to fill vRBs with head of line packets using at least vCSI, with vRBs allocations being passed on to the MAC layer and the MAC layer conducts vRB to RB mapping so that the head of line packets are transmitted over actual, physical RBs.

11. The article of manufacture of claim 10, the CSI feedback by the UE is for a few channels and the MAC layer uses interpolation to estimate the CSI for each resource block.

12. The article of manufacture of claim 10, where a channel quality indicator (CQI) is used as the CSI, where a higher CQI value indicates a better channel condition and a modulation and coding scheme with higher rate.

13. The article of manufacture of claim 12, wherein for a UE of service group (SG) i, its $N_{SGi}$'th sorted CQI value is selected as its vCSI value, the sorting done in an ascending or descending manner, where $N_{SGi}$ corresponds to a number of vRBs leased by the service group i.

14. The article of manufacture of claim 12, wherein for a UE of service group (SG) i, the average of its top $N_{SGi}$ sorted CQI values is selected as its vCSI value, the sorting done in an ascending or descending manner, where $N_{SGi}$ corresponds to a number of vRBs leased by the service group i.

15. The article of manufacture of claim 10, where each UE reports its channel measurements in the form of CSI to a mobile network operator's (MNO's) base station and the MAC layer of the base station then provides virtual CSI (vCSI) values to the vMAC instance of each service group for each UE accessing services of the service group, and where the vMAC instance then conducts its own scheduling to compute the number of vRBs assigned to each of its traffic flows based on the vCSI, flow profiles, and quality of experience/service objectives.

16. The article of manufacture claim 10, where, for each scheduled user k, resource blocks are sorted with respect to $CSI_{k,RB}$ in descending order, and a predetermined number of top ordered resource blocks (RBs) in $CSI_{k,RB}$, $n_k$, are assigned to user k.

17. The article of manufacture claim 16, where when conflicts arise when a given physical RB is tentatively mapped to multiple different vRBs, for each user sharing the conflicting RB, picking a next best unassigned candidate r* from their ordered list as RB candidate, with user, UE, with a smallest $CSI_{UE,r^*}$ value is assigned the conflicting RB and the remaining users that share the conflicting RB are assigned their next best unassigned r*.

18. The article of manufacture of claim 16, where when conflicts arise when a given physical RB is tentatively mapped to multiple different vRBs, for each user sharing the conflicting RB, picking a next best unassigned candidate r* from their ordered list as RB candidate, with user, UE, with a largest difference, $(vCSI_{UE}-CSI_{UE,r^*})$, being assigned the conflicting RB and the remaining users that share the conflicting RB are assigned their next best unassigned r*.

\* \* \* \* \*